United States Patent
Bicchi et al.

(10) Patent No.: US 12,403,613 B2
(45) Date of Patent: Sep. 2, 2025

(54) PROCESS OF INTERACTING WITH OBJECTS

(71) Applicants: UNIVERSITÀ DI PISA, Pisa (IT); FONDAZIONE ISTITUTO ITALIANO DI TECNOLOGIA, Genoa (IT)

(72) Inventors: Antonio Bicchi, Massa (IT); Gianluca Lentini, Cormano (IT); Manuel Giuseppe Catalano, Pisa (IT); Giorgio Grioli, Pisa (IT)

(73) Assignees: UNIVERSITA DI PISA, Pisa (IT); FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 226 days.

(21) Appl. No.: 18/546,286

(22) PCT Filed: Feb. 7, 2022

(86) PCT No.: PCT/IB2022/051027
§ 371 (c)(1),
(2) Date: Aug. 14, 2023

(87) PCT Pub. No.: WO2022/175777
PCT Pub. Date: Aug. 25, 2022

(65) Prior Publication Data
US 2024/0116192 A1     Apr. 11, 2024

(30) Foreign Application Priority Data
Feb. 19, 2021   (IT) .................. 102021000003821

(51) Int. Cl.
*B25J 9/16* (2006.01)
*B25J 13/08* (2006.01)
*B25J 15/12* (2006.01)

(52) U.S. Cl.
CPC ............. *B25J 13/087* (2013.01); *B25J 9/163* (2013.01); *B25J 9/1694* (2013.01); *B25J 15/12* (2013.01)

(58) Field of Classification Search
CPC ........ B25J 13/087; B25J 9/163; B25J 9/1694; B25J 15/12; B25J 9/1671; B25J 19/02; B25J 9/161; B25J 13/06; B25J 13/08
See application file for complete search history.

(56) References Cited

U.S. PATENT DOCUMENTS

| | | | | |
|---|---|---|---|---|
| 4,852,018 A | * | 7/1989 | Grossberg | G05B 19/414 |
| | | | | 706/904 |
| 5,495,410 A | * | 2/1996 | Graf | B25J 9/1671 |
| | | | | 700/86 |

(Continued)

FOREIGN PATENT DOCUMENTS

| | | | | | |
|---|---|---|---|---|---|
| CN | 106142091 B | * | 7/2019 | | B25J 9/161 |
| CN | 115225682 A | * | 10/2022 | | B25J 13/00 |

(Continued)

OTHER PUBLICATIONS

"Embodied Reasoning for Discovering Object Properties via Manipulation," Behrens et al., 2021 IEEE International Conference on Robotics and Automation (ICRA) (2021, pp. 10139-10145); May 30, 2021. (Year: 2021).*

(Continued)

*Primary Examiner* — Khoi H Tran
*Assistant Examiner* — Jorge O Peche
(74) *Attorney, Agent, or Firm* — Vorys, Sater, Seymour and Pease LLP (57) ABSTRACT

A process of interacting with objects is provided including a robot with an end effector, a driver of the end effector and sensors for acquiring at least one environmental or interaction parameter; a computer for controlling the robot; an instruction block configured to instruct the robot to move the (Continued)

end effector according to instructions defined by the instruction block.

10 Claims, 2 Drawing Sheets

(56) References Cited

U.S. PATENT DOCUMENTS

| | | | | |
|---|---|---|---|---|
| 5,798,627 | A * | 8/1998 | Gilliland | B25J 9/1671 |
| | | | | 318/568.14 |
| 5,946,673 | A * | 8/1999 | Francone | G06N 20/00 |
| | | | | 706/13 |
| 6,208,104 | B1 * | 3/2001 | Onoue | B25J 9/161 |
| | | | | 901/6 |
| 6,347,261 | B1 * | 2/2002 | Sakaue | B25J 9/1694 |
| | | | | 345/184 |
| 6,895,305 | B2 * | 5/2005 | Lathan | G16H 20/30 |
| | | | | 600/101 |
| 7,236,854 | B2 * | 6/2007 | Pretlove | G05B 19/42 |
| | | | | 318/568.22 |
| 7,890,194 | B2 * | 2/2011 | Pannese | B25J 9/1671 |
| | | | | 703/22 |
| 8,271,132 | B2 * | 9/2012 | Nielsen | G05D 1/0044 |
| | | | | 700/250 |
| 8,307,061 | B1 * | 11/2012 | Hickman | B25J 9/161 |
| | | | | 709/200 |
| 8,346,391 | B1 * | 1/2013 | Anhalt | B25J 9/163 |
| | | | | 901/50 |
| 8,738,181 | B2 * | 5/2014 | Greer | B25J 9/1671 |
| | | | | 600/407 |
| 9,302,393 | B1 * | 4/2016 | Rosen | G06N 3/008 |
| 9,403,273 | B2 * | 8/2016 | Payton | B25J 9/163 |
| 9,811,074 | B1 * | 11/2017 | Aichele | B25J 9/1656 |
| 10,058,995 | B1 * | 8/2018 | Sampedro | B25J 9/163 |
| 10,131,053 | B1 * | 11/2018 | Sampedro | B25J 9/1666 |
| 10,335,962 | B1 * | 7/2019 | Rosenberg | B25J 9/1674 |
| 10,518,407 | B2 * | 12/2019 | Williams | B25J 9/08 |
| 10,691,121 | B2 * | 6/2020 | Stephens, Jr. | G05D 1/0038 |
| 10,751,877 | B2 * | 8/2020 | Wang | G06T 19/003 |
| 10,766,136 | B1 * | 9/2020 | Porter | G06N 3/045 |
| 10,766,137 | B1 * | 9/2020 | Porter | G06N 3/04 |
| 10,768,708 | B1 * | 9/2020 | Sills | B25J 13/00 |
| 10,792,810 | B1 * | 10/2020 | Beckman | B25J 9/163 |
| 10,981,272 | B1 * | 4/2021 | Nagarajan | B25J 9/1669 |
| 11,037,320 | B1 * | 6/2021 | Ebrahimi Afrouzi | G01C 3/085 |
| 11,069,082 | B1 * | 7/2021 | Ebrahimi Afrouzi | H04N 23/56 |
| 11,199,853 | B1 * | 12/2021 | Afrouzi | B25J 13/006 |
| 11,241,791 | B1 * | 2/2022 | Ebrahimi Afrouzi | G01P 3/68 |
| 11,274,929 | B1 * | 3/2022 | Afrouzi | G06T 7/30 |
| 11,288,883 | B2 * | 3/2022 | Ma | G06T 7/55 |
| 11,385,636 | B2 * | 7/2022 | Jones | G05D 1/0287 |
| 11,389,248 | B1 * | 7/2022 | Roh | G05B 13/0265 |
| 11,457,983 | B1 * | 10/2022 | Roh | A61B 34/25 |
| 11,461,589 | B1 * | 10/2022 | Bai | G06N 3/08 |
| 11,464,573 | B1 * | 10/2022 | Roh | A61B 34/10 |
| 11,464,589 | B1 * | 10/2022 | Roh | G16H 40/20 |
| 11,464,590 | B1 * | 10/2022 | Roh | G16H 40/63 |
| 11,464,650 | B1 * | 10/2022 | Roh | A61B 5/01 |
| 11,494,632 | B1 * | 11/2022 | Bai | G06N 3/09 |
| 11,571,266 | B1 * | 2/2023 | Roh | A61B 90/98 |
| 11,584,004 | B2 * | 2/2023 | Murphy | G05B 13/0265 |
| 11,584,016 | B2 * | 2/2023 | Yamazaki | B25J 9/1612 |
| 11,684,886 | B1 * | 6/2023 | Ebrahimi Afrouzi | B01D 46/76 |
| | | | | 95/282 |
| 11,786,313 | B1 * | 10/2023 | Roh | A61B 34/25 |
| | | | | 700/250 |
| 11,896,328 | B1 * | 2/2024 | Roh | A61B 34/25 |
| 11,931,118 | B1 * | 3/2024 | Roh | A61B 34/25 |
| 12,089,905 | B1 * | 9/2024 | Roh | A61B 34/32 |
| 12,099,357 | B1 * | 9/2024 | Ebrahimi Afrouzi | |
| | | | | G05D 1/0214 |
| 12,168,296 | B1 * | 12/2024 | Bennice | B25J 9/163 |
| 12,269,170 | B1 * | 4/2025 | Ranjbar | B25J 9/163 |
| 12,311,551 | B2 * | 5/2025 | Arase | B25J 9/1687 |
| 12,358,134 | B2 * | 7/2025 | Ogura | G06F 8/34 |
| 12,358,137 | B2 * | 7/2025 | Kimura | B25J 9/0081 |
| 2001/0047226 | A1 * | 11/2001 | Saijo | G06N 3/008 |
| | | | | 318/568.19 |
| 2002/0120362 | A1 * | 8/2002 | Lathan | A63F 13/212 |
| | | | | 700/245 |
| 2003/0023347 | A1 * | 1/2003 | Konno | G05B 19/0426 |
| | | | | 700/245 |
| 2003/0130851 | A1 * | 7/2003 | Nakakita | A63H 3/28 |
| | | | | 704/275 |
| 2004/0189631 | A1 * | 9/2004 | Kazi | G06T 19/006 |
| | | | | 345/418 |
| 2004/0267404 | A1 * | 12/2004 | Danko | E02F 3/438 |
| | | | | 700/245 |
| 2005/0080515 | A1 * | 4/2005 | Watanabe | B25J 9/1671 |
| | | | | 700/264 |
| 2005/0149231 | A1 * | 7/2005 | Pretlove | B25J 9/1671 |
| | | | | 700/264 |
| 2006/0020368 | A1 * | 1/2006 | Tanaka | B25J 9/161 |
| | | | | 700/259 |
| 2006/0212170 | A1 * | 9/2006 | Nagatsuka | G05B 19/4207 |
| | | | | 700/245 |
| 2007/0135933 | A1 * | 6/2007 | Panesse | B25J 9/1671 |
| | | | | 700/17 |
| 2009/0055019 | A1 * | 2/2009 | Stiehl | B25J 9/1671 |
| | | | | 901/17 |
| 2009/0210220 | A1 * | 8/2009 | Mitsuyoshi | G10L 25/90 |
| | | | | 704/207 |
| 2009/0234499 | A1 * | 9/2009 | Nielsen | B25J 9/161 |
| | | | | 700/250 |
| 2009/0234788 | A1 * | 9/2009 | Kwok | G06N 3/006 |
| | | | | 718/1 |
| 2009/0289591 | A1 * | 11/2009 | Kassow | B25J 18/00 |
| | | | | 901/3 |
| 2010/0198402 | A1 * | 8/2010 | Greer | B25J 3/04 |
| | | | | 901/41 |
| 2010/0234857 | A1 * | 9/2010 | Itkowitz | G09B 23/285 |
| | | | | 700/259 |
| 2011/0190932 | A1 * | 8/2011 | Tsusaka | B25J 9/1687 |
| | | | | 700/254 |
| 2011/0208355 | A1 * | 8/2011 | Tsusaka | B25J 13/08 |
| | | | | 901/31 |
| 2012/0127165 | A1 * | 5/2012 | Evans | G05B 19/41885 |
| | | | | 345/419 |
| 2012/0158019 | A1 * | 6/2012 | Tenney | A61B 34/10 |
| | | | | 606/133 |
| 2012/0173018 | A1 * | 7/2012 | Allen | B25J 11/008 |
| | | | | 700/245 |
| 2012/0185090 | A1 * | 7/2012 | Sanchez | B25J 9/161 |
| | | | | 700/253 |
| 2012/0185094 | A1 * | 7/2012 | Rosenstein | B25J 5/007 |
| | | | | 901/1 |
| 2012/0185115 | A1 * | 7/2012 | Dean | G05D 1/0038 |
| | | | | 701/2 |
| 2013/0190776 | A1 * | 7/2013 | Zhang | A61B 17/32053 |
| | | | | 606/133 |
| 2013/0345875 | A1 * | 12/2013 | Brooks | B25J 9/1671 |
| | | | | 700/258 |
| 2013/0346348 | A1 * | 12/2013 | Buehler | G05B 19/423 |
| | | | | 901/31 |
| 2016/0059412 | A1 * | 3/2016 | Oleynik | G05B 19/42 |
| | | | | 700/250 |
| 2016/0257000 | A1 * | 9/2016 | Guerin | B25J 9/1671 |
| 2016/0332297 | A1 * | 11/2016 | Sugaya | B25J 9/1671 |
| 2017/0140259 | A1 * | 5/2017 | Bergstra | G06N 3/044 |
| 2017/0274532 | A1 * | 9/2017 | Nishitani | B25J 9/1671 |
| 2017/0320210 | A1 * | 11/2017 | Ding | B25J 9/1661 |
| 2018/0029232 | A1 * | 2/2018 | Ouchi | B25J 9/1671 |
| 2018/0194009 | A1 * | 7/2018 | Kojima | B25J 9/0018 |
| 2018/0268280 | A1 * | 9/2018 | Tokuchi | G06N 3/045 |
| 2018/0311815 | A1 * | 11/2018 | Shaw | B25J 9/1671 |
| 2018/0311827 | A1 | 11/2018 | Biicchi et al. | |
| 2018/0354130 | A1 * | 12/2018 | Preisinger | G05B 19/423 |
| 2019/0009414 | A1 * | 1/2019 | Lipay | B25J 9/1612 |
| 2019/0176326 | A1 * | 6/2019 | Bingham | B25J 9/1612 |

(56) References Cited

U.S. PATENT DOCUMENTS

| | | | |
|---|---|---|---|
| 2019/0269528 A1 | 9/2019 | Biicchi et al. | |
| 2019/0291277 A1* | 9/2019 | Oleynik | B25J 9/1669 |
| 2019/0314989 A1* | 10/2019 | Sokabe | B25J 9/1664 |
| 2020/0016748 A1* | 1/2020 | Martin | B25J 13/025 |
| 2020/0026478 A1* | 1/2020 | Yamada | G06F 3/147 |
| 2020/0074241 A1* | 3/2020 | Mahmood | G06N 3/006 |
| 2020/0078951 A1* | 3/2020 | Kamoi | G06T 19/006 |
| 2020/0171650 A1* | 6/2020 | Hallock | B25J 9/009 |
| 2020/0171671 A1* | 6/2020 | Huang | B25J 9/0084 |
| 2020/0238519 A1* | 7/2020 | Diankov | B25J 9/1697 |
| 2020/0338725 A1* | 10/2020 | Yutaka | B25J 9/163 |
| 2020/0338734 A1* | 10/2020 | Yutaka | B25J 9/163 |
| 2021/0001481 A1* | 1/2021 | Hayashi | B25J 9/163 |
| 2021/0023707 A1* | 1/2021 | Ma | B25J 9/1697 |
| 2021/0031364 A1* | 2/2021 | Groz | G05D 1/227 |
| 2021/0053216 A1* | 2/2021 | Diankov | B25J 9/1669 |
| 2021/0053230 A1* | 2/2021 | Mizoguchi | B25J 9/1687 |
| 2021/0387350 A1* | 12/2021 | Oleynik | A47J 44/00 |
| 2021/0394359 A1* | 12/2021 | Mathieu | B25J 9/163 |
| 2022/0111517 A1* | 4/2022 | Bennice | B25J 9/1605 |
| 2022/0126445 A1* | 4/2022 | Zhu | B25J 9/1635 |
| 2022/0143820 A1* | 5/2022 | Bashkirov | B25J 9/1641 |
| 2023/0098602 A1* | 3/2023 | Cella | B25J 9/1674 700/248 |
| 2023/0222454 A1* | 7/2023 | Cella | G06N 7/01 705/28 |
| 2023/0241770 A1* | 8/2023 | Itou | B25J 9/1666 700/246 |
| 2024/0116192 A1* | 4/2024 | Bicchi | B25J 9/1694 |
| 2024/0131698 A1* | 4/2024 | Jha | B25J 9/1671 |

FOREIGN PATENT DOCUMENTS

| | | | | |
|---|---|---|---|---|
| DE | 102015204641 A1 | * | 12/2015 | G06F 30/20 |
| DE | 102019001783 A1 | * | 9/2019 | G05B 19/0426 |
| DE | 102019122790 A1 | * | 2/2020 | B25J 9/1612 |
| DE | 102019125126 B4 | * | 12/2020 | H04N 23/66 |
| DE | 102019109880 B4 | * | 12/2022 | B25J 9/1697 |
| DE | 102024134898 A1 | * | 7/2025 | B25J 9/163 |
| EP | 1522912 A2 | * | 4/2005 | B25J 9/1671 |
| JP | 2017523054 A | * | 8/2017 | B25J 9/1676 |
| JP | 2018051652 A | * | 4/2018 | |
| JP | 2018176387 A | * | 11/2018 | B25J 11/0005 |
| JP | 6549545 B2 | * | 7/2019 | B25J 9/1697 |
| JP | 2020157467 A | * | 10/2020 | B25J 11/0055 |
| JP | 2021074872 A | * | 5/2021 | B25J 15/0009 |
| JP | 2021091026 A | * | 6/2021 | B25J 13/06 |
| JP | 6898506 B1 | * | 7/2021 | B25J 9/1612 |
| JP | 6932618 B2 | * | 9/2021 | |
| JP | 2021533425 A | * | 12/2021 | G05D 1/0287 |
| JP | 7322099 B2 | * | 8/2023 | B25J 9/161 |
| JP | 2023551723 A | * | 12/2023 | B25J 9/1612 |
| KR | 102403021 B1 | * | 5/2022 | B25J 13/06 |

OTHER PUBLICATIONS

"A two-arm situated artificial communicator for interactive assembly," Zhang et al., Proceedings 10th IEEE International Workshop on Robot and Human Interactive Communication. ROMAN 2001 (Cat. No. 01TH8591) (2001, pp. 292-299), Jan. 1, 2001. (Year: 2001).*

"Towards a Computer Vision-Based Approach for Digital Twin Implementation," Cristofoletti et al., 2023 International Conference on Intelligent Metaverse Technologies & Applications (iMETA) (2023, pp. 1-6), Sep. 18, 2023. (Year: 2023).*

The International Search Report and Written Opinion for PCT/IB2022/051027, mailed May 10, 2022.

The Italian Search Report for IT 102021000003821, completed Nov. 23, 2021.

Lentini Gianluca et al., "Robot Programming without Coding", 2020 IEEE International Conference on Robotics and Automation (ICRA), May 31, 2020, IEEE, pp. 7576-7582, XP033826241.

* cited by examiner

PROCESS OF INTERACTING WITH OBJECTS

The present invention relates to a process of interacting with objects of the type specified in the preamble to the first claim.

In particular, the invention relates to a process configured to use a robot for handling objects preferably in an automated production and assembly line.

As is well known, automated production and assembly lines are particularly flexible thanks to the exploitation of robots capable of carrying out different tasks and handling products that differ in shape and consistency.

Such robots are now used to move objects between different stations, for example between a warehouse and a workstation, and/or to perform tasks such as assembling and welding.

They are programmed to faithfully perform repetitive tasks with a high degree of precision. These actions are determined by software that specifies the direction, acceleration, speed and distance of a series of coordinated movements.

These movements are defined by the operator who, for each operation, must define the commands and therefore the instructions to be given to the robot to enable it to perform the desired operations.

The known technique described includes some important drawbacks.

In particular, the known handling procedures require the need to instruct the robot for each single action of each new task using specific programming languages. This results in a complex management of production processes and often in errors due to inaccurate identification of the correct program to be executed.

To solve this problem, new processes for defining instructions have been devised. The new commercial robots are equipped with graphical user interfaces (GUIs) that allow operators to program them in a short time.

Although this solution has considerably speeded up programming, it has not led to sufficient improvement. As a result, the known object handling procedures are currently particularly complex, not easy to use and imposing relatively high costs and/or the use of complex and expensive robots.

Another drawback is the lack of flexibility of the known handling processes, which requires almost continuous reprogramming as the robots are not able to adapt to any changes in the movements to be performed and/or the objects to be handled.

In this situation, the technical task at the basis of the present invention is to devise a procedure of interaction with objects able to substantially obviate at least part of the aforementioned drawbacks.

In the context of said technical task, it is an important aim of the invention to obtain an easily programmable and therefore extremely flexible object interaction procedure.

The technical task and the specified purposes are achieved by a process of interacting with objects as claimed in the appended claim 1. Examples of preferred embodiments are described in the dependent claims.

The features and advantages of the invention are hereinafter clarified by the detailed description of preferred embodiments of the invention, with reference to the appended drawings, wherein:

the FIG. 1 shows, to scale, devices configured to implement the process of interacting with objects according to the invention;

the FIG. 2a shows, to scale, an assembly of a device of FIG. 1;

the FIG. 2b illustrates, to scale, the assembly of FIG. 2a in a different use;

the FIG. 3 illustrates, to scale, an environment for implementing the process of interacting with objects according to the invention; and the FIG. 4 illustrates a schematic of the process of interacting with objects according to the invention.

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

The measurements and data reported in this text are to be considered, unless otherwise indicated, as performed in the International Standard Atmosphere ICAO (ISO 2533:1975).

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

With reference to the Figures, the process of interacting with objects according to the invention is globally denoted by number 1.

The process 1 is configured to recognise and interact with objects 1a within an environment 10 such as, for example, a house or flat. Preferably it is configured to recognise and interact with and thus move/handle objects 1a within a working/industrial environment 10 such as a warehouse or production line.

The environment 10 may define a walkable area 10a.

The environment 10 may comprise at least one room 11. In detail it may comprise multiple rooms 11 and at least one passage section 12 between each of the rooms.

The interaction process 1 may comprise at least one robot 2.

The robot 2 may be configured to perform an interaction with at least one object 1a. It 2 may comprise at least one end effector 21 gripping at least one object 1a.

The end effector 2 is configured to interact with an object 1a and in particular of multiple objects 1a suitably different from each other in weight and/or shape. For example, it is configured to interact with and precisely manipulate/execute the gripping of only one object 1a at a time.

The end effector 2 may comprise at least two mutually movable mechanical fingers so as to perform said grasping. Preferably it comprises more than two fingers and in particular it is identifiable in a robotic hand such as, for example, the one described in US2019269528 and US2018311827.

The robot 2 may comprise, for each end effector 21, a driver 22 of the end effector 21.

The driver 22 may be configured to move the end effector 21 with respect to the object 1a and/or the environment 10.

The driver 22 may comprise a robotic arm. It may comprise one or more rigid bodies 221, identifiable in optionally telescopic profiles, and one or more joints 222 suitable for moving the rigid bodies 221 in a suitably independent manner.

The joints 222 may be configured to mutually rotate the rigid bodies 221 by varying the angle of spread between two contiguous bodies 221.

Preferably, the joints 222 move the rigid bodies 221 in accordance with an inverse kinematics or a direct kinematics. It is therefore specified that, even if not expressly stated, each movement of the robot 2 and therefore the instructions defining said movements are determined according to an inverse or direct kinematics.

The expression inverse kinematics defines a trajectory in the operating space of the path of the end effector 21. Therefore, velocity and acceleration of the individual joints 222 are defined so as to have said end effector path 21.

The direct kinematic expression identifies the calculation of a trajectory in space in which the position, velocity and acceleration of the individual joints 222 are determined, not the path of the end effector 21. Accordingly, the path of the end effector 21 is a consequence of the position, velocity and acceleration of each joint 222.

Each joint 222 may be motorised and in detail comprise a servomotor.

The driver 22 may comprise displacement means 223 configured to move the robot 2 along the walkable plane 10a.

The displacement means 223 may be motorised. For example, they may comprise at least one crawler or wheels.

The robot 2 may comprise sensor 23 for acquiring at least one suitably environmental parameter and/or for interacting the robot 2 with the object 1a.

The sensor 23 may comprise one or more sensors each configured to acquire a parameter selected from an environmental parameter and an interaction parameter. Preferably, it is configured to acquire at least one environmental parameter and at least one interaction parameter.

The expression "environmental parameter" identifies a parameter external to the robot 2 and, therefore, not related to its operation. The environmental parameter may be a physical condition specific to the environment 10 (e.g., temperature, humidity, brightness) and/or a characteristic of an object 1a (e.g., shape and/or weight).

The expression "interaction parameter" identifies a parameter related to the operation of the robot 2 when it interacts/manipulates the object 1a. It may, for example, be identified in the gripping position and/or force of the end effector 21 or in the contact temperature object 1a end effector 21.

In the case of acquisition of at least one environmental parameter, the sensing means 23 may comprise one or more sensors chosen from a thermometer; a photodetector, a hygrometer or means for filming the object 1a such as a camera.

In the case of an interaction parameter, the sensor 23 may comprise one or more sensors chosen from a thermometer; a piezoelectric; an encoder for each joint 222.

The sensor 23 may be configured to acquire the movements of the robot so as to allow the definition of the instructions necessary to define the movements of the robot 2.

The robot 2 may comprise a card 24 for controlling the robot 2 and in particular at least the end effector 21 and the driver 22.

The card 24 may be in data connection with the sensor 23.

The interaction procedure 1 may comprise an instruction block 3 configured to define and send to the robot 2 instructions to move the end effector 21 (preferably the driver 22) and thus to interact with one or more objects 1a.

The instruction block 3 may be in data connection with the robot 2 and in detail with the computer 24.

The block 3 may be configured to define and send to the robot 2 the commands necessary to locate an object 1a and to perform the interaction (handling, gripping and/or movement) of the object 1a in the environment 10. For example, the block 3 may be configured to instruct the robot 2 to locate an object 1a if present in the environment 10, to grip the object 1a, to perform one or more operations with said object 1a, and then to store it at a site located in the environment 10.

The instruction block 3 may comprise a computer or other device configured to allow an operator to enter said commands.

Alternatively, the instruction block 3 may be at least partially wearable (FIG. 1) so as to allow the operator to simulate operations and then send said commands to the robot 2 according to the operator's movements. It may comprise a visualiser 31 configured to present to the operator at least part of the parameters acquired by the sensor 23; and acquisition means 32 configured to acquire the movements performed by the operator and send to the robot 2 commands necessary to allow the robot to repeat said movements.

The acquisition means 32 may comprise sensorised gloves configured to detect movements of the operator's hand and send the robot 2 instructions such as to allow said hand movements to be performed by the end effector 21.

Alternatively, the means 32 may comprise a sensorised suit configured to detect the operator's movements and then send the robot 2 instructions such that said movements can be performed.

Instruction block 3 may comprise at least one camera 33, and viewer 31 may comprise a screen (e.g., virtual glasses) for viewing the camera footage.

Figure 1:
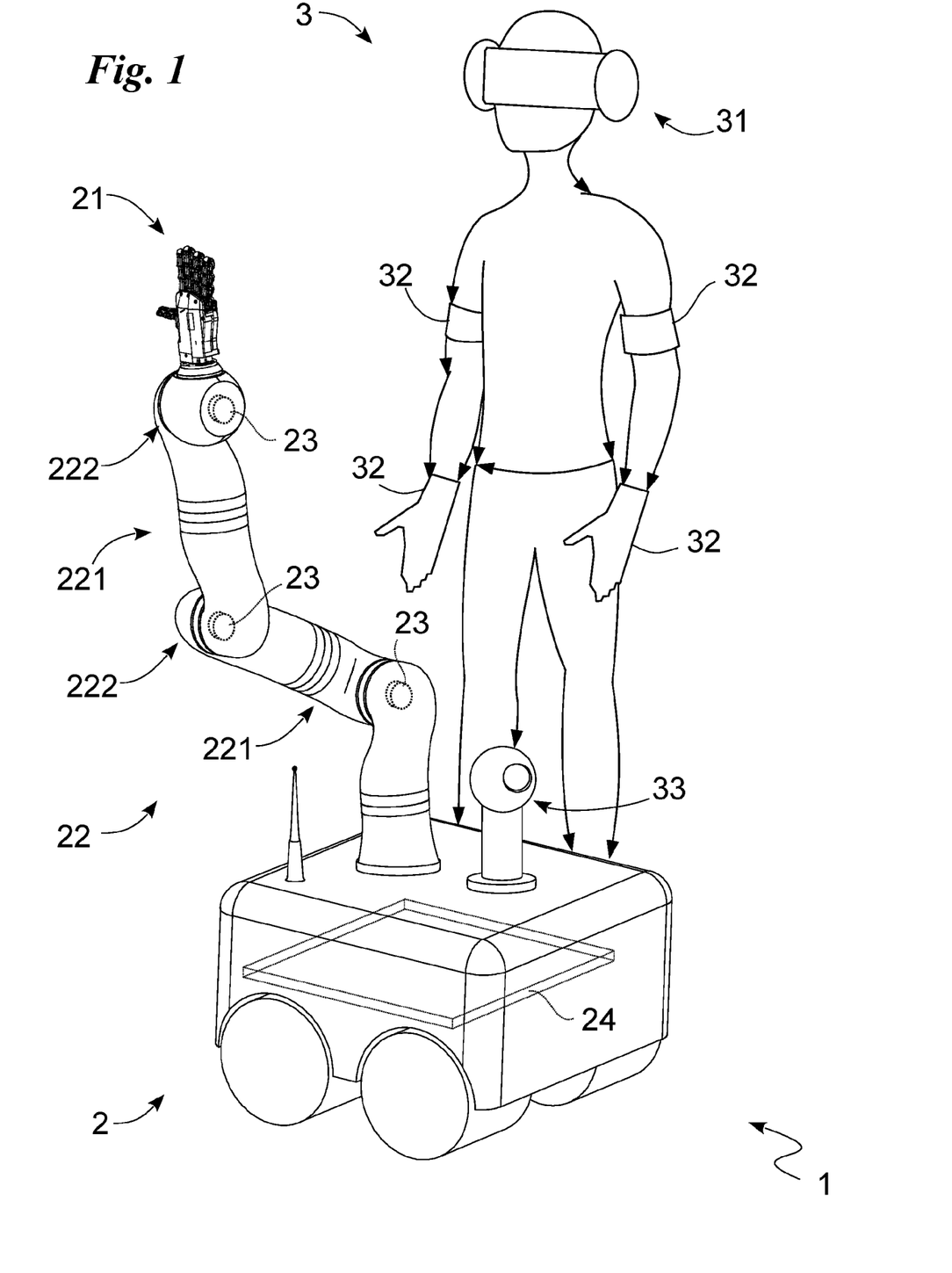
Figure 2A:
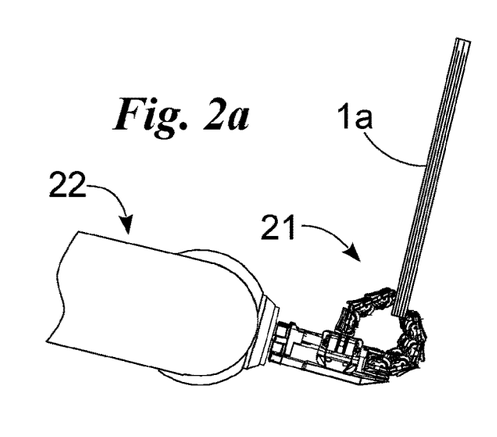
Figure 2B:
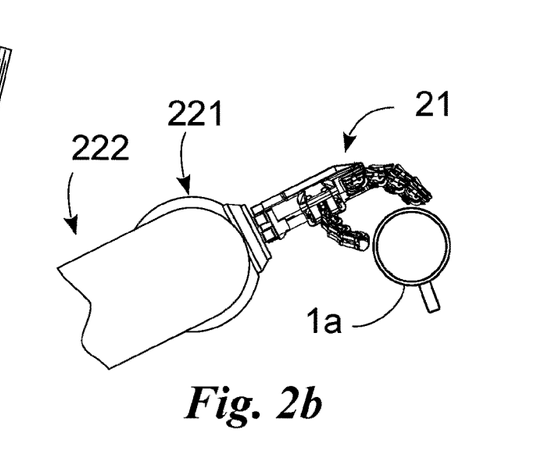
Figure 3:
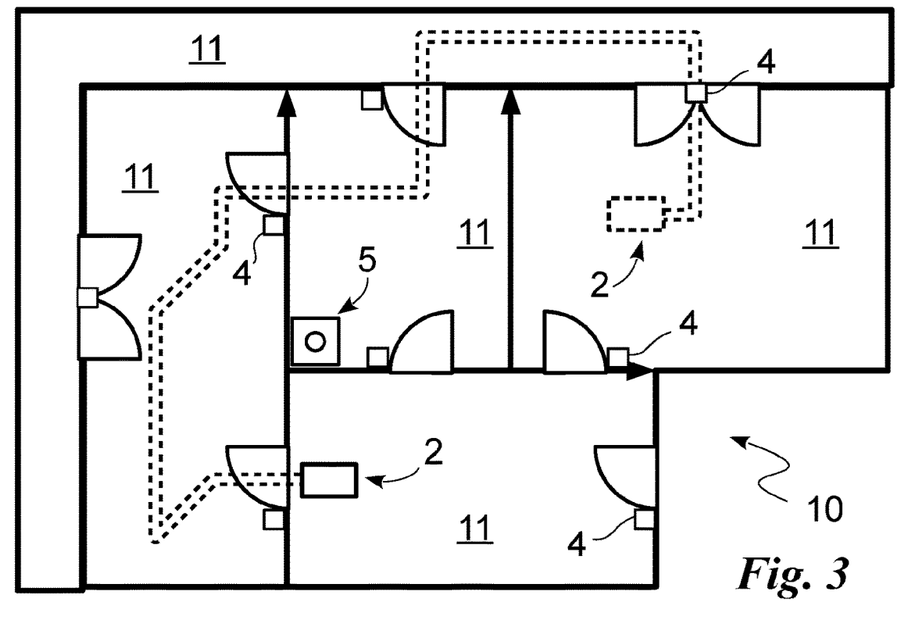

The camera 33 may be integrated into the robot 2 (FIG. 1).

Alternatively, the camera 33 may be integrated into the room 10. Preferably, the instruction block 3 comprises, for each room 11, at least one camera 33 configured to capture the objects 1a and/or the robot in a room.

The interaction procedure 1 may comprise at least one marker 4 configured to be detected by the sensor 23 identifying the path of the robot 2 by detection of the passage of the robot 2 at a particular point (e.g. between two rooms 11, at an object in a room, (and/or between zones in a same room and thus.)

The interaction procedure 1 may comprise a marker 4 associated with each passage section 12 such that the sensor 23 detect the passage through said passage section 12.

Alternatively, or additionally, it may comprise at least one marker 4 associated with each room 11 so as to allow the sensor 23 to detect the entry of the robot 2 into said room 11.

Alternatively, or in addition to the one or more markers 4, the robot 2 may detect its own path thanks to the sensor 23 configured to acquire and thus identify elements (e.g. furniture, doors, or an object 1a) along the path. The robot then detects its own path according to its position with respect to one or more elements detected by said sensor 23.

The process 1 may comprise a robot 2 control computer 5. Optionally, it comprises several robots 2 and a computer 5 controlling said robots 2.

The computer 5 may be configured to control the end effector 21 (and preferably the driver 22) according to the sensor 23 (i.e. one or more of the parameters acquired therefrom) and the instructions described below.

It may be in data connection with the robot 2 and in detail the board 25 and/or the sensor 23.

The computer 5 may be in data connection with the instruction block 3.

The computer 5 may be configured to split an action into a sequence of scenes according to an end-of-scene command. In particular, it may split an action into scenes for each end-of-scene command.

The end of scene command can be given automatically and/or manually.

In the case of an automatic end-of-scene command, the computer 5 may comprise a clock configured to measure the passage of time during the execution of a real/virtual action (described below) and then give the end-of-scene command at the passage of a time substantially equal to a scene duration.

In the case of a manual end-of-scene command, the computer 5 may, via block 3, give the end-of-scene command upon detection of a command action performed by the operator such as, for example, holding a position for at least a time threshold. Alternatively, the block 3 may comprise a signaller (such as a button) configured to be activated by the operator when he wishes to send the end of scene command.

Alternatively, or additionally, the automatic end of scene command may be given by the detection of a marker 4 by the robot 2 or by the identification of an element in the environment 10 by the sensors 23.

The computer may comprise an action database described below.

Figure 4:
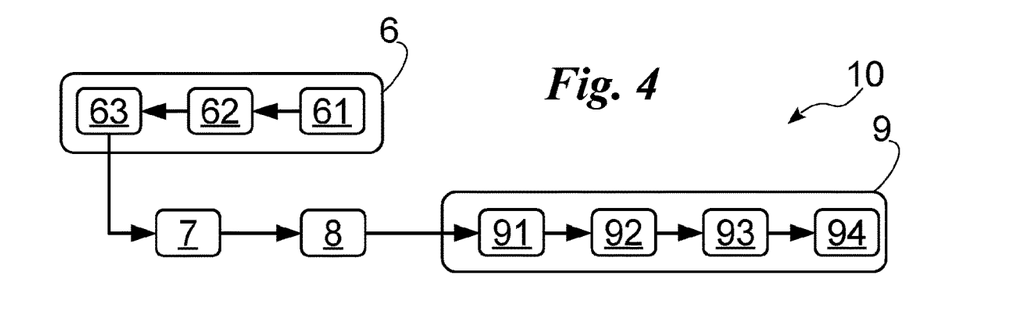

The interaction procedure 1 may comprise at least one learning phase 6 in which the instruction block 3 defines a virtual action in which the robot 2 moves the end effector 21, the computer 5 commands the robot 2 to perform a real action according to said virtual action and the sensor 23 acquire one or more parameters during the performance of the real action.

The virtual action comprises one or more instructions identifying movements to be learned by the robot 2 in accordance with instructions received from the instruction block 3 in the learning phase.

The real action comprises one or more movements that the robot 2 performs in accordance with the instructions of the virtual action. The movements of the real action are performed in accordance with the sequence of instructions of the virtual action. The real action can therefore be similar and optionally the same as the virtual action.

The real action may only be simulated (without movement of the robot 2 and/or manipulation of the one or more objects 1a) and/or real (with movement of the robot 2 and/or manipulation of the one or more objects 1a). Preferably it is real.

Preferably, the interaction procedure 1 comprises multiple learning phases 6. Thus, the block 3 may define multiple virtual actions preferably at least partly different from each other and thus the robot 2 performs multiple real actions.

Each learning phase 6 may comprise a simulation sub-phase 61 in which the instruction block 3 defines a virtual action in which the robot 2 moves the end effector 21.

In the simulation sub-phase 61, the instruction block 3 defines a virtual action and sends to the robot 2 the instructions necessary to perform the real action corresponding to said virtual action.

In some cases, the virtual action may comprise instructions relating to the passage of the robot between two or more rooms 11 appropriately through at least one passage section 12.

Optionally, one or more end-of-scene commands may be given in the simulation sub-phase 61.

The learning phase 6 may comprise a repetition sub-phase 62 in which the computer 5 commands the robot 2 to perform a real action in accordance with said virtual action.

In the repetition sub-phase 62, the computer 5 commands the robot 2 to perform one or more movements defining a real action in accordance with the instructions of the virtual action.

Preferably in the sub-phase 62 the computer 5 commands the robot 2 to substantially repeat the actions performed in the virtual action. Thus, the real action is substantially the same as the virtual action.

In the repetition subphase 62 if provided in the virtual action the robot 2 may move from one room 11 to another through at least one passage section 12.

The learning phase 6 may comprise an acquisition sub-phase 63 in which the sensor 23 acquire one or more parameters during the repetition sub-phase 62.

In the sub-phase 63, the sensor 23 may acquire other environmental parameters (e.g. brightness, pressure and/or temperature of the environment 10) and/or one or more interaction parameters such as grip of the end effector 21 and/or force applied thereto. Preferably in the acquisition sub-phase 63 the sensor 23 may acquire at least environmental parameters of the object 1a (for example shape and/or colour) so as to allow the robot 2 to detect the presence of the object 1a in the environment 10.

Optionally, the sensor 23 may acquire at least one marker 4 so as to allow the computer to identify the path executed. Alternatively, or in addition to the one or more markers 4, the sensor 23 may acquire one or more elements in the environment 10 and the robot 2 defines its own path according to its position with respect to the one or more elements detected by said sensor 23.

In the acquisition sub-phase 63, the sensor 23 may acquire the movements of the robot 2 allowing the definition of the instructions necessary to define the movements that the robot 2 will subsequently have to perform in order to repeat said movements.

The acquisition sub-phase 63 concludes by sending to the computer 5 the acquisition parameters, one or more end-of-scene commands and the inscriptions relating to the movements of the robot 2.

The sub-phases 61, 62 and 63 may be performed almost simultaneously.

The interaction procedure 1 may comprise an analysis phase 7 in which each of the actual actions performed in the learning phase 6 is fractionated into a sequence of scenes of.

In the analysis phase 7, the computer 5 may split, appropriately in accordance with the at least one end scene command, each of the real actions into an initial scene, an end scene and preferably at least one scene intermediate between the initial and final scenes.

The computer 5 may associate with each scene one or more instructions for the robot 2 defining the operation to be performed by the robot. Said instructions are defined in accordance with the movements of the robot 2 detected in the acquisition sub-phase 63.

In some cases, the initial scene may not be associated with instructions.

The computer 5 may associate with each scene at least one value corresponding to a parameter (environmental and/or interaction) acquired during the execution of the scene in the learning phase 6 and in detail at the beginning of the scene, i.e. immediately after receiving the end-of-scene command.

In this document, the term "value" identifies a parameter recorded by the sensors 23 in the learning phase 6 and appropriately stored in the action database below.

Preferably, the computer 5 associates to each scene a value for each of the parameters acquired in the learning phase 6.

The interaction process 1 may comprise a reprocessing phase 8 in which the computer 5 creates an action database by associating with each other the actual actions having substantially identical the at least one value associated with the initial scene so as to define a compound action comprising a single initial scene and a plurality of final scenes.

Preferably, actual actions having initial scenes having the same values and optionally the same instructions are associated with each other.

The number of final scenes may be substantially equal to the number of real actions grouped together.

If there are one or more intermediate scenes, two or more of them may be merged only if they have substantially the same instructions and optionally the same values.

To summarise, a compound action has a single initial scene from which several final scenes branch off. If present, the intermediate scenes can identify the one or more branches connecting each final scene to the initial scene.

In the action database each scene can be associated with one or more instructions for robot 2.

Each scene of a compound action may be associated with at least one value, i.e. with the one or more parameters acquired by the sensor 23 during the execution of the scene in each learning phase 6 of the real actions merged in said compound action. In detail, for each of the parameters detected by a same sensor during the execution of a scene in the various learning phases 6 the scene is associated with only one value if such parameters are almost equal to each other; whereas if such parameters are different from each other the scene is associated with several values each of which corresponding to a parameter detected by the sensor in a learning phase 6.

Each value of a scene is linked to at least one scene subsequent to said scene so as to allow to identify the order of execution of the scenes. In this document, the expression "next scene" identifies the scene adjacent to or immediately following a given scene.

In the case of different values deriving from the parameters detected by the same sensor, each of these values can be linked to only part of the following scenes. In detail, at least one scene upstream of a bifurcation between alternative scenes of a compound action may be associated with values, each of which is connected to only part (in detail to only one) of the subsequent alternative scenes, so that the robot 2 may identify which of the alternative scenes to execute based on said value.

The interaction procedure 1 may comprise an execution phase 9 in which the robot 2, suitably in automatic mode, performs one of the actions of the action database.

In detail, in the execution phase 9 the sensor 23 defines an initial factor by detecting said at least one parameter, the computer 5 selects in the action database the compound action having an initial value substantially equal to the initial factor and commands the robot 2 to execute an operation according to the scene following the initial scene of the identified compound action; and the computer 5 commands the robot 2 to execute the next operation to be executed among the next scenes associated with the compound action selected by comparing the at least one value associated in the action database with one or more of the scenes prior to the next one (thus still to be executed) with the at least one factor acquired by detecting at least one parameter in one or more of the operations prior to the next one.

In this document, the term "factor" identifies a parameter recorded by the sensors 23 in the execution phase 9.

The execution phase 9 may comprise an acquisition sub-phase 91 in which the sensor 23 defines at least one initial factor by detecting said at least one parameter.

The initial factor is acquirable at the start of the robot 2, i.e. before it performs any action. Preferably, in the acquisition sub-phase 91 the sensor 23 acquire all the parameters and then define for each of them an initial factor.

In the acquisition sub-phase 91 the robot 2 may be substantially stationary.

The execution phase 9 may comprise an identification sub-phase 92 of the compound action to be performed.

In the identification sub-phase 92, the computer 5 selects in the action database the compound action having an initial value substantially equal to said initial factor. In detail, the computer 5 selects in the action database the compound action having initial values substantially equal to all initial factors defined in the sub-phase 91.

Having identified the compound action, the development sub-phase 93 is concluded by the computer 3 which commands the robot 2 to execute the scene following the initial one;

The execution phase 9 may comprise at least one development sub-phase 93 in which the robot 2 performs an operation in accordance with the identified scene and in particular the instructions associated therewith.

The execution phase 9 may thus comprise at least one selection sub-phase 94 in which the computer 5 identifies among the scenes of the composed action the next scene to be executed and then commands the robot 2 to perform an operation in accordance with said next scene.

In this sub-phase 94, the computer 5 identifies among the next scenes the next scene to be appropriately executed in a following development sub-phase 93.

This choice may be performed by comparing the at least one value of the at least one scene prior to said next scene with one or more of the factors defined in the actions performed so far. The next scene to be performed may be the one connected to the one or more values of the at least one antecedent scene substantially equal to the one or more factors corresponding to the parameters detected in the previous operations.

This value-factor comparison may be performed for all the actions and scenes up to the initial one.

Having identified the next scene, the computer 5 commands the robot 2 to execute an operation in accordance with said next scene and then to execute a new development sub-phase 93 and a new selection sub-phase 94.

The execution phase 9 ends when in the selection sub-phase 94 the final scene is selected as the next scene and then in the next development sub-phase 93 a final operation is executed according to said final scene.

In order to clarify the description of the procedure we give an example application of the procedure of interaction 1.

Initially, the procedure envisages the execution of two learning phases 6, i.e. a first phase 6 comprising first sub-phases of simulation 61, repetition 62 and acquisition 63 and a second learning phase 6 comprising second sub-phases of simulation 61, repetition 62 and acquisition 63).

In a first simulation sub-phase 61, the operator, by means of instruction block 3, simulates a first virtual action comprising locating a glass, picking up the empty glass from a first room 12, reaching a second room 12, filling the glass with a carafe and arranging the glass on a tray. At the end of each part of the virtual action the operator gives an end of scene command defining in this example five scenes.

Simultaneously with the first sub-phase 61 there is the first repetition sub-phase 62 the robot 2, guided by the computer 5 according to the signals arriving from the block 3, repeats the aforementioned actions; and the first acquisition sub-phase 63 in which the sensor 23 acquire, preferably in sequence, parameters identifying the glass; glass pick-up instructions and weight of the empty glass; room change instructions 12 (identification of one or more elements and/or one or more markers 4); jug identification parameters and glass filling instructions; and finally tray identification parameters (object placement site 1a) and the instructions for placing the glass on the tray.

Once the first learning phase 6 is completed, the procedure provides for the second learning phase 6.

In the second simulation sub-phase 61 the operator, by means of the instruction block 3, simulates a second virtual action consisting of: locating a glass, picking up the full glass from a first room 12, reaching a second room 12 and arranging the glass on a tray. At the end of each part of this second virtual action the operator gives an end of scene command defining in this second example four scenes.

Simultaneously with the second sub-phase 61, there is the second repetition sub-phase 62 the robot 2, guided by the computer 5 according to the signals arriving from the block 3, repeats the aforementioned actions; and the second acquisition sub-phase 63 in which the sensor 23 acquires, preferably in sequence, glass identification parameters; glass pick-up instructions and weight of the full glass; room change instructions 12; and tray identification parameters and the instructions for placing the glass on the tray.

Having completed all the phases 6, the interaction procedure 1 provides for an analysis phase 7, in which the two actions are divided into scenes according to the end-of-scene commands with associated instructions and parameters acquired in each scene.

The first real action is subdivided into an initial scene of locating a glass, first intermediate scene of picking up the empty glass from a first room 12, second intermediate scene of reaching a second room 12, third intermediate scene of filling the glass with a carafe and final scene of placing the glass on a tray.

The second real action is subdivided into an initial scene of locating a glass, first intermediate scene of picking up the full glass from a first room 12, second intermediate scene of reaching a second room 12 and final scene of placing the glass on a tray.

At this point there is the reprocessing phase 8 of the scenes and then the creation of the action database.

In this example, since the initial scenes are the same, a compound action is defined with two final scenes and in detail a ramification at the end of the second intermediate scene.

To be precise, the compound action provides an initial scene associated with the value "glass identification"; a first intermediate scene associated with the picking instructions and two values (full glass weight and empty glass weight) and a second intermediate scene the room 12 change instructions (detection of one or more markers 4 and/or one or more elements in the environment 10). Thus, the compound action provides for branching (i.e. the possibility of performing different operations). In the first branch of the branching, the compound action comprises a third scene associated with filling the glass and a final scene of arranging the glass on the tray; and in the second branch, the compound action comprises only a final scene of arranging the glass on the tray.

The first branch is linked to the empty glass weight value of the first intermediate scene and the second branch is linked to the full glass weight value of the first intermediate scene.

At this point, execution phase 9 may take place.

In the acquisition sub-phase 91, the sensors 23 detect/identify a glass and thus define a corresponding initial factor.

In the identification sub-phase 92 in which the computer 5 searches the action database for the compound action having an initial scene with an initial value substantially equal to said initial factor and commands the execution of the scene following the initial scene i.e. the first intermediate scene. It should be noted that the sub-phases 91 and 92 can end only upon detection of an initial factor corresponding to an initial value present in the action database.

There is then the development sub-phase 93 in which, in accordance with the first intermediate scene, the robot 2 performs the operations of picking up the glass (for example full) and the sensor 23 acquires the factor relative to the weight of the glass.

At this point, there is the selection sub-phase 94 in which the computer 5 searches among the scenes subsequent to the first intermediate scene (i.e. in the one or more second intermediate scenes) for the one related to the acquired factor. In this case, since only the second intermediate scene is present, the computer 5 commands execution.

The execution phase 9 then provides a new sub-phase of execution 93 in which the robot 2 performs operations in accordance with the second intermediate scene. It then moves from the first room 12 to the second room 12 and the sensor 23 acquires the acquired factor corresponding to the marker 4 and/or detected element.

Since the final scene has not been performed, a new selection sub-phase 94 occurs in which the computer 5 searches among the scenes following the second intermediate scene for the one connected to the acquired factor.

Since there are two possible successive scenes, computer 3 searches among the factors acquired in the previous operations which of the previous scenes (i.e. in the second intermediate scene, in the first intermediate scene and in the initial scene) has values corresponding to the factors acquired in the corresponding sub-phases 93. In detail, it, by identifying in the first sub-phase the detection of the factor "full glass", detects that the corresponding value is associated with the final scene of the second case, recognizes as the next scene the final scene of the second case and commands its execution.

The execution phase 9 provides a new sub-phase 93 of performing an operation according to the final scene. In detail, the robot 2 searches in the room 12 for the tray, identifies it and places the glass back on the tray.

At the end of this development sub-phase 93, phase 9 is concluded as a final scene of the identified compound action has been performed.

The interaction procedure 1 according to the invention achieves important advantages. In fact, the procedure 1 allows to instruct a robot 2 in a practical and fast way and above all to quickly update the particular action database.

Another advantage, related to the creation and use of the action database, lies in the fact that the interaction procedure 1 allows to manage, without complex and expensive structures, a multiplicity of distinct operations without errors in identifying the correct action to be performed.

This advantage also translates into the possibility of controlling several robots 2 simultaneously in a precise, simple and fast manner.

Another advantage is the simplicity of instructing robot 2.

Another advantage is therefore to be identified in the high flexibility of the interaction procedure 1 which, in fact, does not require continuous reprogramming as the particular use of the sensor 23 allows the robots 2 to adapt to changes in the movements to be performed and/or in the objects 1*a* with which they interact. For example, in fact, the robot 2, being able to identify an object 1*a* irrespective of its position in the environment 10 and/or the location site, can quickly adapt to any working condition and therefore perform the fastest movement to position the object 1*a*.

The invention is susceptible to variations within the scope of the inventive concept defined by the claims.

For example, at least in the case of the interaction process 1, the card 24 and the computer 5 may coincide.

Furthermore, in the case of choosing the next scene in the selection sub-phase 63, the computer may select as the next scene the one connected to the value closest to the factor acquired in the at least one prior operation.

In some cases, the instructions may only identify the final position of the object 1*a* and/or the robot 2. Therefore, it will be the robot 2 that, based on the parameters acquired by the sensor 23, will automatically define the movements to be performed to reach this final position. For example, the instructions may identify the positioning of an object 1*a* on a site and then the robot 2 will define by itself which movements to perform to arrange said object 1*a* on said site.

In some cases, the sensor 23 may comprise a camera and the display screen 31 may display the camera footage.

In such an embodiment, all details are replaceable by equivalent elements and materials, shapes and sizes can be any.

The invention claimed is:

1. A process of interacting with objects comprising at least one robot comprising:
an end effector of interaction with at least one of said objects;
a driver of said end effector;
sensors for acquiring at least one parameter; said at least one parameter comprising at least one of an environmental parameter and a parameter of interaction of said robot with said object;
a computer for controlling said robot in data connection with said sensor;
an instruction block configured to instruct said robot to move said end effector;
a plurality of learning phases; in each of said learning phases
said instruction block defines a virtual action in which said robot performs a movement of said end effector,
said computer commands said robot to perform a real action according to said virtual action, and
said sensor acquires said at least one parameter during the execution of said real action;
an analysis phase in which said computer
subdivides each of said real actions into an initial scene, a final scene, and
associates with each of said scenes at least one value corresponding to said at least one parameter acquired in said scene;
a reprocessing phase in which said computer creates an action database associating said real actions having substantially the same initial value so as to define a compound action comprising a single initial scene and a plurality of final scenes; said action database associates at least one of said values with each of said scenes;
an execution phase in which
said sensor defines at least one initial factor by detecting said at least one parameter said computer selects in said action database said compound action having said initial value substantially equal to said initial factor and commands said robot to perform an operation substantially equal to a scene subsequent to said initial scene of said compound action; and
said computer commands said robot the next operation to be performed between said scenes associated with said compound action in said action database chosen by comparing
said at least one value associated in said action database with the at least one scene prior to said next scene
with said at least one factor acquired by detecting said at least one parameter in said operation prior to said subsequent operation,
and comprising:
a sub-phase of acquisition in which said sensor defines said initial factor by detecting said at least one parameter,
a identification sub-phase in which said computer selects in said database actions having said initial value substantially equal to said initial factor and commands to said robot the execution of at least one scene subsequent to said initial scene;
at least one development sub-phase in which said robot performs an operation according to said initial scene of said compound action selected in said identification sub-phase and defines a factor by acquiring at least one parameter,
at least one selection sub-phase wherein said computer identifies the next scene to be executed among said scenes of said compound action and commands said robot to perform an operation according to said next scene; and wherein said computer identifies said next scene by comparing said at least one value associated with said at least one scene prior to said next scene with said factor acquired in said at least one prior operation;
wherein said sensor is configured to acquire said movements of said robot by defining instructions necessary for defining movements of said robot; and
wherein in said reprocessing phase said computer associates in said database actions said instructions to at least one of said scenes.

2. The process according to claim 1, wherein said initial scene is devoid of said instructions.

3. The process according to claim 1, wherein said execution phase terminates when one of said final scenes is selected as the next scene and then said robot is commanded to perform a final operation according to said final scene.

4. The process according to claim 1, wherein in each of said learning phases said at least one end scene command is defined; and wherein in said analysis phase wherein said computer subdivides each of said actual actions into said scenes in accordance with said at least one end scene command.

5. The process according to claim 4, wherein in each of said learning phases said at least one end-of-scene command is given automatically.

6. The process according to claim 5, wherein said computer comprises a clock configured to measure the passage of time; and wherein in each of said learning phases said computer defines a of said at least one end-of-scene command at the passage of a time substantially equal to a scene duration.

7. The process according to claim 4, wherein in each of said learning phases said at least one end-of-scene command is given in a manual manner.

8. The process according to claim 7, wherein said instruction block comprises a signaller configured to send said end-of-scene command.

9. The process according to claim 5, wherein in each of said learning phases said at least one end-of-scene command is given in a manual manner.

10. The process according to claim 6, wherein in each of said learning phases said at least one end-of-scene command is given in a manual manner.

* * * * *